United States Patent Office 2,701,148
Patented Feb. 1, 1955

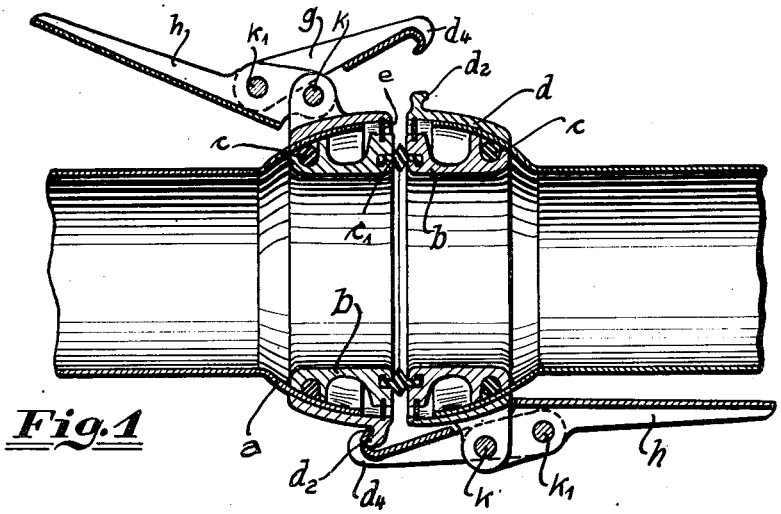
Fig. 1
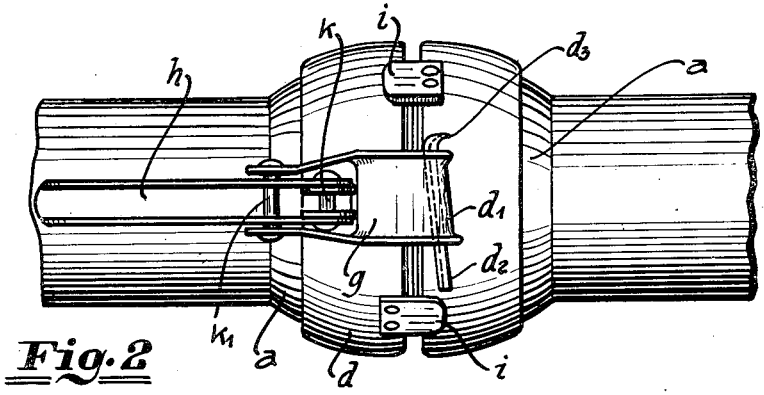
Fig. 2
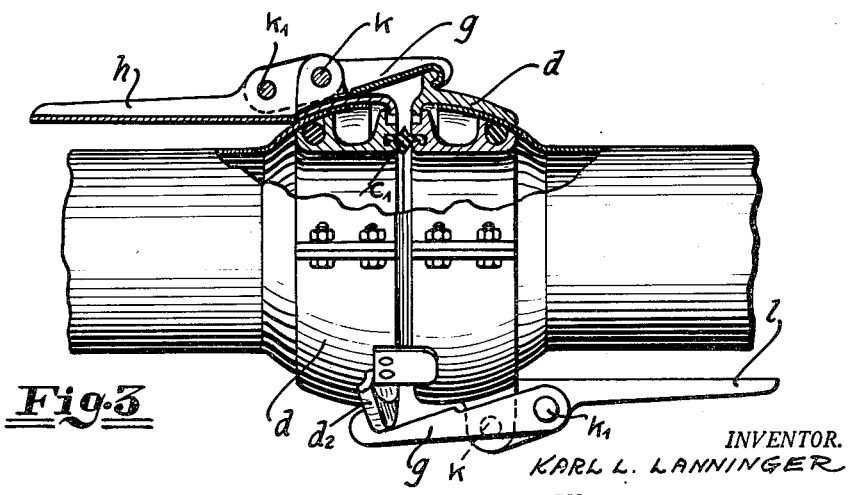
Fig. 3
INVENTOR.
KARL L. LANNINGER
BY
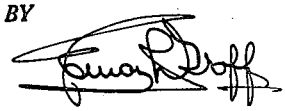

2,701,148

PIPE COUPLING

Karl Ludwig Lanninger, Frankfurt am Main, Germany

Application June 13, 1950, Serial No. 167,754

Claims priority, application Sweden August 17, 1949

1 Claim. (Cl. 285—92)

This invention relates to pipe couplings, and more particularly to an improvement in couplings of the flexible type.

Rigid pipe or hose couplings have the disadvantage that they are generally of symmetrical construction, thereby requiring the pipe sections to be connected to be perfectly aligned. The setting up of pipes in this manner, that is, to make certain that the pipes are in the proper position, generally entails considerable loss of time. This is particularly inconvenient when it is required to rapidly lay or re-lay a pipe line as in the case of extinguishing a fire or laying a sprinkling system, or over uneven terrain.

To obviate these objections, the present invention relates to an improved type of flexible coupling which permits of rapidly setting up the pipes in angular relation. That is to say, each of the adjacent pipe ends to be joined is provided with identical spherical cup-like flanges, an internal annular sleeve, and a two-part external coupling ring arranged thereon carrying complementary locking members. The internal annular sleeve between the two spherical cup-like flanges avoids enlargement of the flow area of the pipe line and includes packing surfaces or packing inserts bearing against the spherical cup-like flanges. The sleeve may be made in one piece or may also be divided, in which event the half corresponding to each spherical cup bears against the corresponding locking ring. The facing ends of the divided sleeve halves are then provided with packing rings.

The locking members on the rings may be of any known design as long ts their construction is symmetrical. Because of this symmetrical design, either one of the two ends of a pipe can be coupled to either one of the two ends of another pipe. Furthermore, the pipes can be laid at a wide angle.

The pipe ends may also be made to extend deep into the spherical cups, in which case gaskets are inserted between the pipe ends and the cylindrical pieces.

The new construction will now be explained more in detail, reference being made to the accompanying drawings, in which:

Figure 1 is a section through another embodiment using clamping levers as locking members;

Figures 2 and 3 are two elevational views, differing by 90°, of the construction shown in Figure 1.

Similar references designate corresponding parts throughout the several views.

In the construction shown in Figures 1–3 are shown clamps $g$ which are linked to tension levers $h$ by means of bolts $k_1$. The tension levers $h$ are rotatable about bolts $k$ of the coupling rings $d$ slidable on cups $a$. The clamps $g$ are provided with noses $d_4$, which in the closed position overlap the ribs $d_2$ of the companion ring. Moreover, in this construction the ribs $d_2$ have bent ends $d_3$, and guide flaps $i$ are provided on the rings $d$ to facilitate the aligning of rings $d$ prior to effecting the coupling. In the adjacent free end of the inner sleeves $b$ are grooves receiving a gasket $c_1$ and near those ends each sleeve is connected to its coupling ring by an annular disc $e$.

I claim:

A quickly connectible and disconnectible flexible pipe coupling structure comprising a pair of flaring cup portions each at one end of a pipe, a pair of internal sleeves having fluid sealing means each engaging the inner side of a cup portion, a pair of external coupling rings each engageable with the outer side of a cup portion, each cup portion, sleeve and external coupling ring being a symmetrical duplicate of the other corresponding element, operable means attached to a coupling ring and cooperating with a second means attached to the other coupling ring and when operated pulling the two coupling rings toward one another, and gaskets each mounted on the end of an inner sleeve confronting the other sleeve and a pair of discs each connecting an inner sleeve to a ring.

References Cited in the file of this patent

UNITED STATES PATENTS

| 831,551   | Guttzeit      | Sept. 25, 1906 |
| 1,331,715 | Lindfors      | Feb. 24, 1920  |
| 1,561,033 | Spencer       | Nov. 10, 1925  |
| 1,782,484 | Spencer et al.| Nov. 25, 1930  |
| 1,888,026 | Chapman       | Nov. 15, 1932  |
| 2,283,975 | Dillon        | May 26, 1942   |
| 2,494,854 | Anderson      | Jan. 7, 1950   |

FOREIGN PATENTS

| 30,283  | Norway  | May 8, 1917   |
| 440,867 | Germany | Feb. 21, 1927 |